2,923,714

1-PICOLINOYL-2-BENZYL HYDRAZINE AND SALTS

Thomas Samuel Gardner, Rutherford, John Lee, Essex Fells, Edward Wenis, Leonia, and Wilhelm Wenner, Upper Montclair, N.J., assignors to Hoffmann-La Roche Inc., Nutley, N.J., a corporation of New Jersey No Drawing. Application February 13, 1958
Serial No. 714,962

4 Claims. (Cl. 260—295)

This invention relates to the novel compound 1-picolinoyl-2-benzylhydrazine and to acid addition salts thereof.

1-picolinoyl-2-benzylhydrazine is produced by catalytically hydrogenating 1-picolinoyl-2-benzylidendrazine, preferably in an inert solvent and in the presence of palladium-carbon catalyst, and recovering the product from the mother liquor after separation of the catalyst.

1-picolinoyl-2-benzylhydrazine forms acid addition salts with various inorganic and organic acids. Such salts are also within the scope of this invention. Illustrative acid addition salts include the hydrohalides, e.g. hydrochloride, hydrobromide, hydroiodide, other mineral acids salts, e.g. sulfate, phosphate, nitrate, and other acid salts such as tartrate, citrate, camphorsulfonate, ethanesulfonate, salicylate, ascorbate, malate, mandelate, etc. The hydrohalides, particularly the hydrochloride, are especially preferred. The acid addition salts of 1-picolinoyl-2-benzylhydrazine are prepared by reacting that compound with the appropriate acid, preferably in an inert solvent with an excess of the acid and recovering the product by conventional means from the reaction mixture.

The compounds of this invention are amine oxidase inhibitors, that is, they inhibit the activity of amine oxidase which effects the deactivation of physiological regulators such as serotonin, tryptamine, epinephrine, etc. and stimulates the central nervous system. They are particularly useful for relief of disturbed states in psychotherapy. The free base or a pharmaceutically acceptable acid addition salt thereof may be administered orally or parenterally in conventional solid or liquid dosage forms, such as tablets, capsules, injectables, etc., comprising therapeutic doses incorporated in conventional solid or liquid vehicles either with or without excipients.

Example 1

942 g. of 1-picolinoyl-2-benzylidenehydrazine in 5 liters of ethanol were reduced with hydrogen at 500 p.s.i. using 150 g. of 10% palladium-on-charcoal at 25° C. The temperature spontaneously rose to 50° C. during the reaction. Reduction was continued until a 20% calculated excess of hydrogen was taken up by the reaction solution.

After completion of the hydrogenation, the catalyst was filtered off and the mother liquor was concentrated to 2 liters. On cooling, the product crystallized and was recovered by filtration. Additional crude product was obtained by concentrating the filtrate and cooling. The combined yield was recrystallized from 1.8 liters of boiling ethanol. The colorless, crystalline 1-picolinoyl-2-benzylhydrazine thus obtained melted at 87–88° C.

Example 2

3 grams of 1-picolinoyl-2-benzylhydrazine were dissolved in 10 ml. of ethanol containing hydrogen bromide gas. Upon the addition of ether, 1-picolinoyl-2-benzylhydrazine hydrobromide crystallized. The salt was recrystallized from ethanol-ether, M.P. 163–164° C.

Example 3

3 grams of 1-picolinoyl-2-benzylhydrazine were added to 100 cc. of ethanol and 5 cc. of 85% phosphoric acid. On addition of ether, 1-picolinoyl-2-benzylhydrazine phosphate precipitated as a syrup which did not crystallize.

Example 4

3 grams of 1-picolinoyl-2-benzylhydrazine were added to 100 cc. of ethanol containing 5 g. of tartaric acid. Upon the addition of ether to the reaction mixture, 1-picolinoyl-2-benzylhydrazine tartrate precipitated as an amorphous solid which did not crystallize.

Example 5

To 10 g. of 1-picolinoyl-2-benzylhydrazine in ethanol were added 10 cc. of 20% hydrogen chloride in ethanol. Upon addition of ether to the reaction mixture, 1-picolinoyl-2-benzylhydrazine hydrochloride crystallized.

This application is a continuation-in-part of our copending application Serial No. 650,834, filed April 5, 1957, now abandoned.

We claim:
1. A member of the group consisting of 1-picolinoyl-2-benzylhydrazine and pharmaceutically acceptable acid addition salts thereof.
2. Pharmaceutically acceptable acid addition salts of 1-picolinoyl-2-benzylhydrazine.
3. 1-picolinoyl-2-benzylhydrazine hydrobromide.
4. 1-picolinoyl-2-benzylhydrazine.

References Cited in the file of this patent

Meyer et al.: Monatshefte für Chemie, vol. 33, p. 396 (1912).

Fox et al.: J. Org. Chem., vol. 18, No. 8, pp. 998 and 1000 (1933).